April 6, 1965

S. D. LAPHAM 3,176,607

CONTINUOUS FILTER

Filed July 6, 1961

INVENTOR:
SIDNEY D. LAPHAM
BY
ATTORNEYS

April 6, 1965 S. D. LAPHAM 3,176,607
CONTINUOUS FILTER
Filed July 6, 1961 5 Sheets-Sheet 2

INVENTOR:
SIDNEY D. LAPHAM
BY
ATTORNEYS

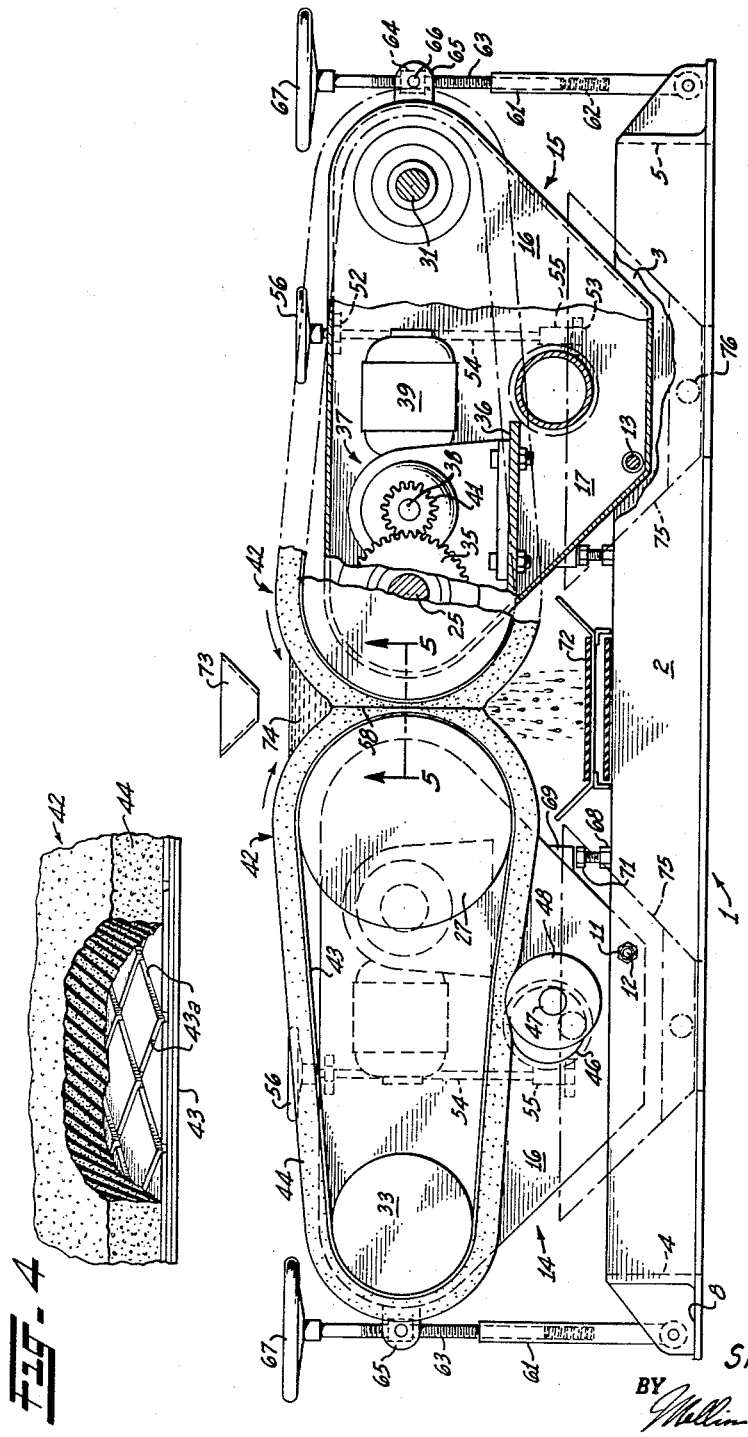

April 6, 1965 S. D. LAPHAM 3,176,607
CONTINUOUS FILTER
Filed July 6, 1961 5 Sheets-Sheet 5

INVENTOR:
SIDNEY D. LAPHAM
BY
ATTORNEYS

United States Patent Office 3,176,607
Patented Apr. 6, 1965

3,176,607
CONTINUOUS FILTER
Sidney D. Lapham, Rte. 2, Box 319, Martinez, Calif.
Filed July 6, 1961, Ser. No. 122,224
13 Claims. (Cl. 100—118)

This invention relates to and in general has for its object the provision of a continuous rotary filter.

Continuous rotary drum filters currently in use actually consist of a plurality of separate filtrate compartments formed around the periphery of a drum and each piped to an automatic valve. The automatic valve operates to successively subject each of the filtrate compartments to a partial vacuum during the cake pick-up and drying cycles and then either to atmospheric pressure or to a blow-back during the cake discharge cycle of operation.

More specifically one of the objects of this invention is the provision of a continuous rotary filter in which advantage is taken of the fact that when a compressed sponge is released a partial vacuum is created within its capillary or interstitial cells as a result of the expansion of the sponge under its own inherent resiliency.

Another object of this invention is the provision of a continuous rotary filter including a pair of rotating sponge belts arranged to converge into pressure contact with each other over an extended pressure zone and to form a slurry receiving trough immediately above said pressure zone.

A further object of this invention is the provision, in a filter of the character above described, of means for blanking off the inner surface of said sponge belts at least over an area opposite said pressure zone so as to prevent the passage of filtrate outwardly through said inner face.

Another object of this invention is the provision of a filter of the character above described wherein the sponge belts are made to travel over highly crowned contiguous drums and wherein the slurry is fed to the trough formed by the two drums only over the central crowned portions of the drum.

A further object of this invention is the provision of a filter of the character above described wherein the gauge of the sponge belts is greater at its sides than at its central or median portion.

Another object of this invention is the provision of a filter of the character above described wherein the side edges of the sponge belt are water-sealed.

Still another object of this invention is the provision in a continuous filter of the character above described of a pair of aligned frames, each pivoted intermediate its ends to a common base for rotatively mounting said sponge belts, and wherein means is provided for tilting one or both frames toward each other so as to vary the degree of pressure between said belts at said pressure zone.

A further object of this invention is the provision in a filter of the character above described of a rotary bearing mounted in each of said frames, a take-up or press roll eccentrically journaled in each of said bearings for engaging the inner surface of one of said sponge belts and means for varying the annularity of each of said rotary bearings thereby to vary the degree of pressure between its press roll and the sponge belt associated therewith.

Another object of this invention is the provision of a filter belt including an impervious conveyor belt to the outer surface of which is bonded a continuous, relatively heavy layer or belt of sponge material.

Still another object of this invention is the provision of a filter of the above character wherein at least one of said contiguous drums is wrapped with a course, stiff, rigid screen and a sponge belt devoid of any impervious backing is made to pass around this drum and around another idler drum.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 3 is a front elevation of the filter shown in FIGS. 1 and 2 but with portions thereof partly in section, all as viewed along the dot-dash line 3—3 of FIG. 1.

FIG. 4 is an enlarged, fragmentary perspective view of a portion of my improved filter belt.

Figure 1:
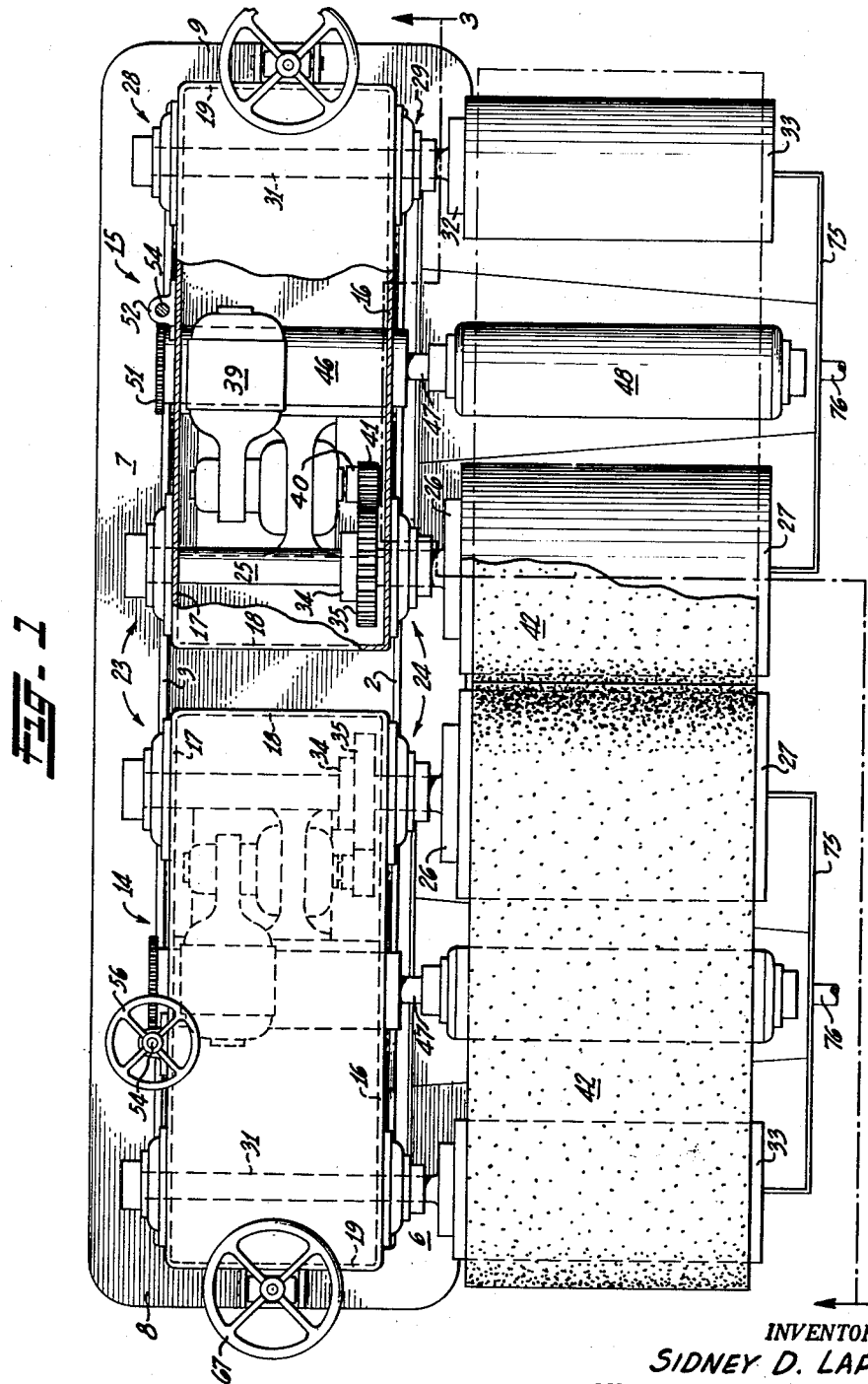
FIG. 1 is a top plan view of a continuous rotary filter embodying the objects of my invention.

As shown in these figures, my filter is mounted on an elongated, generally rectangular base 1, including upstanding side flanges 2 and 3, upstanding end flanges 4 and 5, horizontally extending side feet 6 and 7, and horizontally extending end feet 8 and 9.

Extending through and across the side flanges 2 and 3 and secured thereto by nuts 11 are a pair of longitudinally spaced pivot rods 12 and 13. Pivoted to each of the rods 12 and 13 within the confines of the base side flanges 2 and 3 are identical but respectively left- and right-hand rigid box frames 14 and 15. Each of the box frames includes opposed, parallel side plates 16 and 17, opposed, parallel end plates 18 and 19, a bottom 21 and a top 22.

Fixed to the side plates 16 and 17 of each of the frames 14 and 15 adjacent their inner ends are opposed, coaxial bearing assemblies 23 and 24, and journaled therein is a shaft 25. Fixed to the inner end of each of the shafts 25 is a face plate 26, and coaxially bolted to each face plate 26 is a cantilevered closed-ended, crowned drum 27.

Similarly fixed to the outer end of each frame assembly 14 and 15 are opposed, coaxial bearing assemblies 28 and 29, and journaled in each such pair of bearing assemblies is a shaft 31. Provided on the inner end of each shaft 31 is a face plate 32, and coaxially bolted thereto is a cantilevered closed-ended, crowned cylinder or pulley 33.

Fixed to each of the shafts 25 is a collar 34, and mounted on each shaft 25 and secured to its associated collar 34 is a gear 35. Bridging the opposed side plates 16 and 17 of each of the frames 14 and 15 and affixed thereto is a platform 36, and bolted thereto is a variable-speed gear box and motor assembly 37 including a gear box shaft 38 driven by the motor 39 of the assembly. Fixed to each shaft 38 is a collar 40, and secured thereto is a pinion 41 in the plane of the gear 35 and in mesh therewith.

Reeved about the drum 27 and pulley 33 of each of the frames 14 and 15 is a belt 42, the details of which are best shown in FIG. 4. As shown in this figure, each belt 42 includes an under supporting belt 43 made of conventional fabric-reinforced conveyor belting, but which is preferably provided on its upper surface with a plurality of intercommunicating fluid channels 43a. Although for purposes of illustration the channels 43a have been shown in a diamond configuration, any other suitable configuration can be used. Bonded to the channeled side of the conveyor belt 43 is a thick blanket or belt 44 of sponge material preferably in the order of from 1 to 2 inches thick and at least ½ inch thick, although there is nothing critical about this dimension. Although a natural sponge material can be used for this purpose, a synthetic sponge is preferably used having intercommunicating interstitial cells extending in all directions. The particular type of sponge used should, of course, be inert with respect to the slurry being filtered, and it should have a relatively high degree of resiliency so that when relieved of pressure it will immediately expand to its normal configuration.

Figure 5:
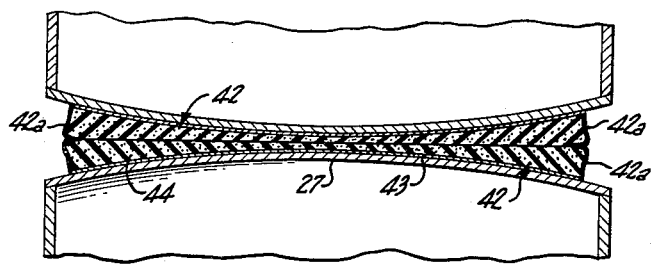
FIG. 5 is an enlarged fragmentary horizontal section taken through the section line 5—5 of FIG. 3.
Figure 6:
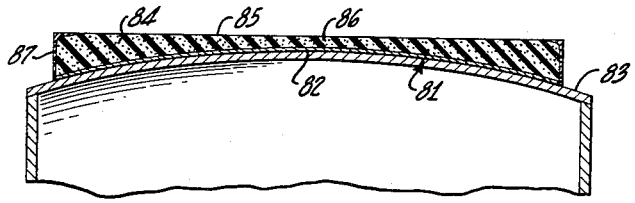
FIG. 6 is a section taken through a modified filter belt molded or formed with a negative crown.
Figure 7:
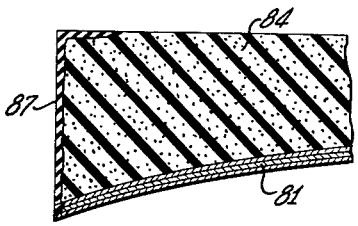
FIG. 7 is an enlarged fragmentary detail of the filter belt illustrated in FIG. 6 showing the manner in which the side edges of the belt are water-sealed.

As indicated in FIGS. 5, 6 and 7, the side edges of the sponge belts 44 are sealed with a coating of film 42a of a material similar in chemical composition to the material from which the belts are made. Preferably the coating or film 42a should be carried slightly over the outer corners of the belts. As a result of this construction, liquid contained in the belts is constrained from flowing from the edges of the belts.

Journaled in each of the frame sides 16 and 17 is a bearing cylinder 46, and eccentrically mounted in the bearing cylinder 46 is a shaft 47. Journaled on each of the shafts 47 is a belt take-up and compressing cylinder 48 arranged to underlie its associated belt 42. The function of each cylinder is twofold. To enable the belts 42 to be easily mounted over their associated drums 27 and cylinders 33, they are made oversize—that is, substantially longer than would otherwise be necessary, and when installing the belts the bearing cylinders 46 are rotated through an angle sufficient to bring each shaft 47 to its lowermost position. This results in translating each cylinder 48 to its lowermost position and away from the normal path of the lower reach of its associated belt 42. The slack belt can then be readily shoved into place and, this having been done, the slack in each belt can be taken up by translating the cylinders 48 upwardly into any desired pressure engagement with the belts. This not only takes up the slack in the belts, but also serves to squeeze the sponge belts 44 at the zones of contact with the take-up and press rolls and thus squeeze or express filtrate therefrom.

To this end there is affixed to the free end of each of the bearing cylinders 46 a pinion 51. Journaled in vertically aligned bearings 52 and 53 fixed to side plate 17 of each of the frames 14 and 15 is a rod or shaft 54. Fixed to the lower end of each shaft 54 is a worm 55. Meshing with one of the pinions 51 and mounted on the upper end of each shaft 54 is a hand wheel 56. Rotation of the hand wheels 56 therefore results in the rotation of their associated bearing cylinders 46, and this in turn, and as explained, results in the vertical displacement or adjustment of the take-up and press rolls or cylinders 48.

As shown in FIGS. 1 and 3, the frames 14 and 15 are so located on the common base 1 that when the filter is in its operative position the inner or adjacent ends of the two belts 42 run in pressure engagement with each other over an extended rectangular pressure or contact zone indicated in FIG. 3 by the reference numeral 58. Here it should be recalled that the frames 14 and 15 are respectively pivoted to the base 1 on the transverse, parallel rods 12 and 13, and that they are therefore free to rock about the axes of these rods. To adjust the inclination of each of the frames 14 and 15 relative to the base 1 and therefore the clearance or degree of contact between the contiguous ends of the belts 42, there is swiveled to each end of the base 1 a sleeve 61. Seated in each sleeve 61 is a compression spring 62. Axially slidable within each sleeve 61 and seated on the spring 62 is a screw 63. Threaded on the screw is a nut 64. Fixed to and extending outwardly from the free or outer end of each of the frames 14 and 15 are a pair of lugs 65 arranged to straddle the nut 64. Extending through each pair of lugs 65 and into the straddled nut 64 are coaxial pins 66. As a result of this construction each nut 64 is free to rotate about the axis of its supporting pin 66. Secured to the upper free end of each screw 63 is a hand wheel 67. Upon the clockwise rotation of the hand wheel 67, the screw 63 moves downward through its nut 64, thereby increasing the length of the screw between the nut and the top of the compression spring 62. As a result of this the right-hand frame 15 is biased in a counterclockwise direction, and similarly the left-hand frame 14 can be independently biased in a clockwise direction. This then serves as a means for resiliently biasing the two belts 42 together under any desired degree of pressure. By backing off the screws 63, the pressure between the two belts can be entirely relieved, and if the screws 63 are backed off sufficiently to clear their associated sleeves 61, it becomes possible to tilt the frames 14 and 15 away from each other so as to leave substantial positive clearance between the two belts. This, of course, is advantageous when it is desired to install or change belts.

To further determine the pressure between the belts 42, nuts 68 are welded to the base 1 in line with shoulders 69 formed on the frame plates. Threaded into each nut 68 is a stop bolt 71. Since the shoulders 69 seat on top of the bolts 71, the level of the latter determines the degree of pressure between the two filter belts.

Preferably, the frames 14 and 15 and the entire structure supported thereby are so designed that the center of mass of each frame lies substantially in a vertical plane passing through its pivotal axis, the axis of the pin 13 or of the pin 14. By resorting to such a relationship of parts, each frame can be readily rocked about its pivotal axis.

Mounted on the base 1 transversely thereof and in vertical alignment with the belt compression zone 58 is an endless conveyor belt 72. Mounted above the belt compression zone 58 is a source of slurry 73 for feeding and distributing slurry to the trough 74 formed by the converging ends of the two filter belts 42. In some applications the source of slurry 73 should be such that slurry is fed only to the center of the trough 74 rather than throughout the entire width of the trough. The reason for this is that in the case of some slurries, such as for example apple pumice, it is desired to squeeze the pumice under considerable pressure. This can of course be best done at the high point of the crowned drums 27, for it is at this point that the drums 27, are under the greatest degree of compression.

Seated on the ground or floor beneath each of the take-up and press rolls 48 is an inclined filtrate pan 75 provided at its lower end with a filtrate outlet connection 76.

The two belts 42 are so driven that, as shown in FIG. 3, their upper reaches travel into their pressure zone 58. Both belts should, of course, be driven substantially at a common speed, a speed which for purposes of illustration can be roughly in the order of 1 foot per second. However, the actual speed selected depends upon the character of the slurry being filtered and the degree to which the two filter belts are compressed. The degree of compression of the two belts should at a minimum be such that substantially no liquid will flow downwardly across the plane or zone of pressure contact 58; in operation each belt serves as a dam for the other.

As the two belts enter the zone 58 they are progressively compressed until they reach the horizontal plane determined by an axis of the two shafts 25. Along this plane the slurry is compressed to the greatest extent at the crown of the drums and consequently the liquid content thereof is forced laterally through the sponge belts to the sides thereof, these sides being under a lesser degree of compression. Beyond this plane the two belts progressively expand, thereby creating a partial vacuum within the cells or interstitial spaces of the sponge material or belts 42. This action continues within the two belts up to their point or line of divergence. Thus the two belts 42 become saturated with filtrate. The solid content of the slurry is retained between the central portions of the sponge belts free of liquid and drops by gravity from the two belts at the point of divergence therefrom. Due to the downward rotation of the two belts, liquor or filtrate entrained therein is pushed downwardly partly through the constricted portion of the belts and partly through the conveyor belt channels 43a. This downward travel of the filtrate is enhanced by the partial vacuum existing in the expanding portions of the belts. The filtrate remains entrained in the two belts until each belt is engaged and squeezed by its associated press roll 48 as shown in the left-hand portion of FIG. 3. Since each sponge belt 44 is backed by the impervious conveyor belt 43, the sponge belts 44 are squeezed between the press rolls 48 and the conveyor belt 43 with the result that the filtrate entrained in the belts 44 is expressed therefrom and drops into one of the filtrate pans 75.

The resulting filtrate will be cloudy, but nevertheless substantially free of all but fine particles. Due to the very nature of the sponge belts 44, they will in due course become plugged with solids and a point will be reached where the rate of filtration is uneconomical. When this occurs, new belts are substituted and, due to the construction of my filter, this can readily be done within a reasonable shutdown period. Even if this had to be done every day, the cost thereof is not prohibitive, for sponge belts can be procured at a relatively low cost.

In many operations this type of continuous filter replaces batch juice extractors requiring at least one operator per shift. The value of my filter is then not dependent on a filtration rate greater than that of batch filters, nor necessarily on initial cost, for the saving of labor here becomes a dominating factor.

Although, as here illustrated, the preferred embodiment of my filter makes use of elongated filtering belts, each belt can, of course, be mounted directly on a single imperforate drum. The press rolls 48 would then operate directly on these drums. The rocking frames 14 and 15 would still serve the purpose of determining the pressure between the two drums and of enabling them to be moved away from each other for the purpose of substituting new sponge belts or blankets for plugged blankets.

Normally drums or pulleys over which belts are reeved are crowned usually to the extent of about ⅛ inch per foot. In other words, a 2-foot pulley is given a ⅛-inch crown. This is done solely to make the belt track properly. In my case, however, the drums 27 are given an additional crown not for tracking purposes, but rather to place the slurry under a high degree of compression at this point, and it is at this point that the slurry is fed between the sponge belts. However, this expedient is resorted to only in cases where the partial vacuum resulting from the expansion of the sponge belts is insufficient to drain the solids free of liquor and it becomes necessary to physically or mechanically squeeze liquor from the solids. In some operations the partial vacuum referred to is alone sufficient to extract the liquor from the solids.

Now referring to FIGS. 6 and 7, showing a modified form of filter belt. Here the supporting impervious rubber belting 81 is provided during its manufacture with a high crown 82, a crown equal to the crown of the drum 83 over which it is reeved. Bonded to the upper surface of the crowned belting 81 is a continuous sponge blanket 84 crowned on its lower surface complementary to the crown of the belting. The outer or upper surface 85 of the blanket 84, however, is straight, with the consequence that the lateral portions of the blanket are relatively thick and diverge inwardly to a relatively thin central portion 86. The thin central sponge portion 86 is desirable to trap the slurry at the point of feed and to insure that it travels downwardly with the sponge belts rather than being continually squeezed upwardly as would be the case if only smooth surfaces were presented to the slurry. As a result of this construction the slurry, instead of being squeezed between two relatively thick sponges, is squeezed for all practical purposes only by the solid drums. This structure, then, is to be differentiated from the structure shown in FIG. 5 and wherein the sponge belts 42a are of uniform thickness through their width and length when in their undeformed or noncompressed condition.

FIG. 7 merely serves the purpose of better showing that the sponge belts 84, like the sponge belts 44, are water-sealed along their edges by a coating 87 of a material preferably having the same chemical characteristics as the material from which the sponge belts are made.

Figure 8:
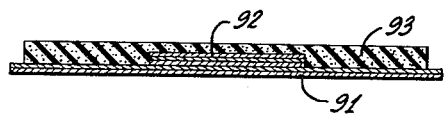
FIG. 8 is a transverse horizontal section taken through a modified form of sponge filter belting.

The endless filter belt illustrated in FIG. 8 includes an endless fabric-reinforced rubber belt 91 provided with a raised central step 92 made of the same material. Bonded to and over this structure is an endless sponge belt 93 contoured to receive the step 92. The belts so formed are designed to take the place of endless sponge belts 42 shown in FIG. 3, and when so used the drums 27 and 33 are formed without the usual crown, other means being resorted to for making the belts track. Also, when so used it will be noted that the squeeze zone between the two belts occurs primarily over their stepped portions 92 and that the sides of each belt are only slightly compressed. This makes for a sharp compression area as distinguished from the gradually receding compression area resulting from the use of the crowned rollers illustrated in FIGS. 5 and 6.

Figure 9:
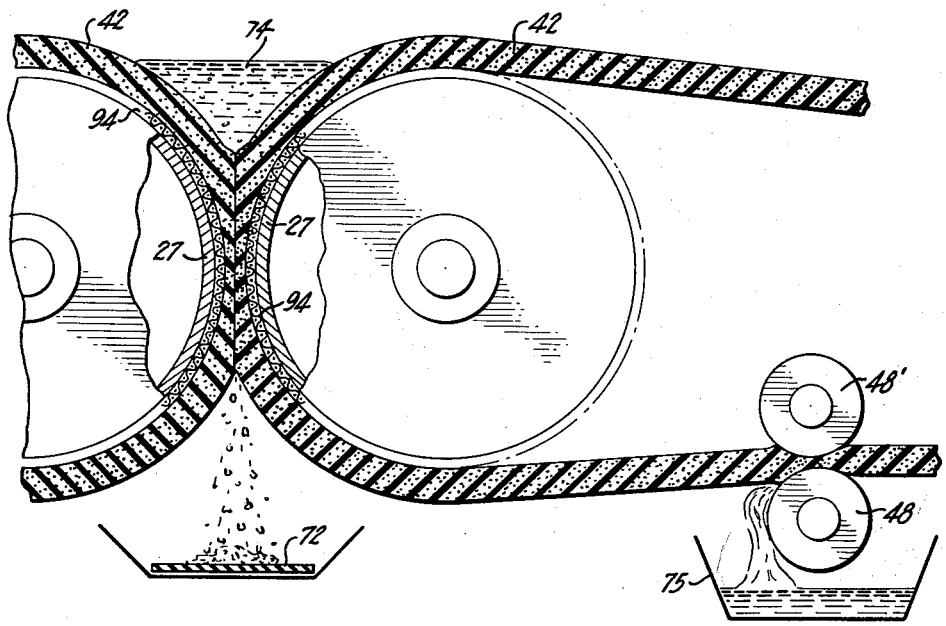
FIG. 9 is a diagrammatic illustration of a modification of the filter illustrated in FIGS. 1-4.

Referring to FIG. 9, it will be seen that each of the drums 27 is here provided with a coarse endless screen 94 securely fastened to its associated drum 27. The endless sponge belts 42 are devoid of any impervious backing material and are arranged to travel in contact with the screens 94 and which serve as filtrate compartments for receiving filtrate from the sponge belts at the compression zone thereof. After the belts have passed their compression zone, the filtrate then contained within the confines of the screen 94 is drawn back into the sponge belts 42 and can be squeezed therefrom by the squeeze rolls 48 and 48'. In the meantime and before the filtrate re-entering the sponge belts 42 has an opportunity to reach the outer faces thereof and to wet the filter cake carried thereon, the cake falls by gravity onto the conveyor belt 72. Apparently it is the fact that the cake is not again rewetted by the filtrate tha enables a relatively clean break between the cake and the sponge belt, even in cases where rather sticky cakes such as apple pumice are being handled.

Figure 2:
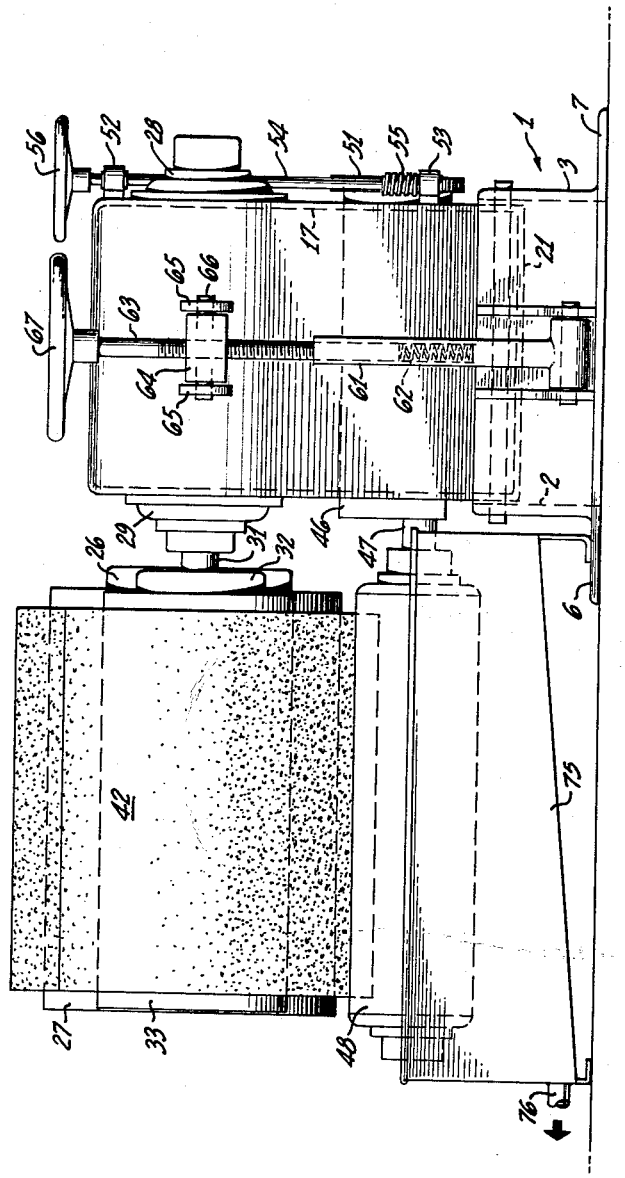
FIG. 2 is a right-hand end view of the filter illustrated in FIG. 1.

Actually this modification is somewhat comparable to the modification illustrated in FIG. 4. The screen 94 here performs the function of the channels 43a of the conveyor belt 43 and serves as a filtrate compartment for the filtrate squeezed inwardly through the sponge belts. Except for these differences, this modification is identical to that illustrated in FIGS. 1, 2 and 3.

I claim:

1. A continuous rotary filter comprising an endless sponge belt; an endless rotating dam located adjacent said belt, said belt and dam being arranged to converge into compressing contact with each other over a limited zone and to form a downwardly converging trough above said limited zone; means for feeding a slurry to said trough; means for rotating said belt and dam towards each other and downwardly through said trough at substantially equal speeds; means for blanking off the inner surface of said belt at least over an area adjacent said limited zone; said belt and blanking off means being constructed and arranged to provide a liquid storage zone to accommodate liquid displaced from said slurry during said compressing contact; and means downstream from said limited zone for squeezing said displaced liquid from said belt.

2. A continuous rotary filter of the character set forth in claim 1 wherein said dam is in the form of a second endless sponge belt and wherein means is provided for blanking off the inner surface thereof at least over an area opposite said limited zone.

3. A continuous rotary filter comprising: a pair of endless sponge belts; means for constraining each of said belts to travel in a closed path into convergence with each other over a predetermined zone of compressing contact and to form a horizontal valley between said belts above said zone of contact the direction of travel of said belts being such that they travel towards each other into said valley; means for feeding a slurry to said valley; means for blanking off the interior surfaces of said belts at least adjacent said zone of contact; means for adjusting the pressure between said belts at said zone of contact; said belts and blanking off means being constructed and arranged to provide a liquid storage zone to accommodate liquid displaced from said slurry during said compressing contact; and means downstream from said zone of compressing contact for squeezing said displaced liquid from said belts.

4. A continuous rotary filter such as set forth in claim 3 wherein the inner surface of each of said belts is blanked off by an impervious flexible material.

5. A continuous rotary filter such as set forth in claim 3 wherein each of said sponge belts is carried on an impervious conveyor belt.

6. A continuous rotary filter such as set forth in claim 5 wherein the inner surface of each of said conveyor belts is provided with a plurality of intercommunicating fluid channels.

7. A filter medium comprising: an impervious conveyor belt faced on one side thereof with a continuous layer of sponge material, said one side of said conveyor belt in contact with said sponge material being provided with a plurality of intercommunicating fluid channels.

8. A continuous rotary filter comprising: a base; a first frame mounted to and over said base; a first rotatable endless sponge filter belt mounted on said first frame; a second frame overlaying and pivoted intermediate its ends to said base in alignment with said first frame; a second rotatable endless sponge filter belt mounted on said frame; said first and second belts being arranged to converge with each other over a predetermined zone of compressing contact and to form a horizontal trough above said zone of contact; means for feeding a slurry to said trough; means for blanking off the interior surfaces of said belts at least adjacent said zone of contact; said belts and blanking off means being constructed and arranged to provide a liquid storage zone to accommodate liquid displaced from said slurry during said compressing contact; means downstream from said zone of contact for squeezing said displaced liquid from said belts; and means for adjusting the angularity of said second frame relative to its pivotal axis thereby to adjust the clearance or degree of contact between said first and second belts.

9. A filter medium comprising: an impervious conveyor belt faced on one side thereof with a continuous layer of sponge material, the thickness of which continuously increases from the center line of said belt to its edges.

10. A filter medium of the character set forth in claim 9 wherein the side edges of said layer of sponge material are coated with a water-sealing material.

11. A filter medium of the character set forth in claim 9 wherein said conveyor belt is formed with a crown.

12. A continuous filter comprising: an impervious rotary drum; a screen circumscribing and rigidly fixed to said drum; an endless sponge belt reeved over said drum; means for progressively compressing said sponge belt against said screen; said means forming with said endless belt a downwardly converging trough means; means for delivering pulp to said trough means; and means for squeezing filtrate from said sponge belt downstream of the point at which said sponge belt is compressed.

13. A filtering medium comprising an impervious supporting belt formed over its central portion with a continuous raised step; an endless sponge belt bonded to said belt, the inner surface of said sponge belt being complementary to the engaging surface of said supporting belt.

References Cited by the Examiner

UNITED STATES PATENTS

| | | | |
|---|---|---|---|
| 1,449,774 | 3/23 | Najarian | 210—326 X |
| 2,195,371 | 3/40 | Moore | 198—193 |
| 2,904,495 | 9/59 | Ferris | 210—401 X |

REUBEN FRIEDMAN, *Primary Examiner.*

EUGENE BLANCHARD, *Examiner.*